(12) United States Patent
Horigome

(10) Patent No.: US 7,929,393 B2
(45) Date of Patent: Apr. 19, 2011

(54) OPTICAL INFORMATION RECORDING DEVICE AND RECORDING CORRECTION CALCULATION METHOD

(75) Inventor: Toshihiro Horigome, Kanagawa (JP)

(73) Assignee: Sony Corporation, Tokyo (JP)

( * ) Notice: Subject to any disclaimer, the term of this patent is extended or adjusted under 35 U.S.C. 154(b) by 289 days.

(21) Appl. No.: 12/351,128

(22) Filed: Jan. 9, 2009

(65) Prior Publication Data

US 2009/0201776 A1 Aug. 13, 2009

(30) Foreign Application Priority Data

Feb. 7, 2008 (JP) ................................. 2008-028062

(51) Int. Cl.
*G11B 7/00* (2006.01)

(52) U.S. Cl. ................ 369/59.17; 369/59.11; 369/59.23

(58) Field of Classification Search ............... 369/59.17, 369/59.23
See application file for complete search history.

(56) References Cited

U.S. PATENT DOCUMENTS

| | | | | |
|---|---|---|---|---|
| 7,760,605 B2* | 7/2010 | Kakimoto et al. | ......... | 369/53.26 |
| 2004/0022151 A1* | 2/2004 | Furumiya et al. | ......... | 369/47.53 |
| 2005/0099925 A1* | 5/2005 | Nakajo | ...................... | 369/59.12 |
| 2007/0109938 A1* | 5/2007 | Shirota et al. | .............. | 369/59.11 |
| 2007/0183290 A1* | 8/2007 | Yu et al. | ...................... | 369/59.19 |
| 2008/0025179 A1* | 1/2008 | Fujita et al. | ................. | 369/59.11 |

FOREIGN PATENT DOCUMENTS

| | | |
|---|---|---|
| JP | 5-89473 | 4/1993 |
| JP | 2005-99416 | 4/2005 |
| JP | 2005-317064 | 11/2005 |
| JP | 2006-302332 | 11/2006 |
| JP | 2007-18582 | 1/2007 |
| JP | 2007-220206 | 8/2007 |
| WO | WO 2007/094456 A1 | 8/2007 |

* cited by examiner

*Primary Examiner* — Lixi Chow
(74) *Attorney, Agent, or Firm* — Oblon, Spivak, McClelland, Maier & Neustadt, L.L.P.

(57) ABSTRACT

When recording recording information by forming on a recording medium a recording mark whose mark length is an integral multiple of the reference mark length according to a recording signal generated from a recording information signal, this method performs a process of: generating, after recording compensation recording information on the recording medium, a reproduction signal by reading out the compensation recording information; generating from the reproduction signal a reproduction clock whose cycle corresponds to the reference mark length; setting a signal level suitable for binarization determination of the reproduction signal as a distribution reference level, according to the difference in variation between white and black levels of the reproduction signal; and calculating the recording correction value for correcting the compensation recording signal, so that the reproduction signal becomes closer to the distribution reference level around a target cross timing determined based on the reproduction clock.

10 Claims, 12 Drawing Sheets

100 OPTICAL DISC

OPTICAL INFORMATION RECORDING DEVICE AND RECORDING CORRECTION CALCULATION METHOD

CROSS REFERENCES TO RELATED APPLICATIONS

The present invention contains subject matter related to Japanese Patent Application JP2008-028062 filed in the Japanese Patent Office on Feb. 7, 2008, the entire contents of which being incorporated herein by reference.

BACKGROUND OF THE INVENTION

1. Field of the Invention

The present invention relates to an optical information recording device and recording correction calculation method, and is preferably applied to for example an optical disc device that records information on a recording medium using an optical beam.

2. Description of the Related Art

There is an optical disc device, or an optical information recording and reproduction device, that uses a discoid optical disc containing an information recording layer as an information recording medium: the information recording media include Compact Disc (CD), Digital Versatile Disc (DVD) or "Blu-ray Disc (Registered Trademark: referred to as BD, hereinafter)". Such optical disc devices have been popular.

By the way, the optical disc device is designed to record on an optical disc various kinds of information, such as various kinds of content (including music and video content) and various kinds of computer data. Especially in recent years, the amount of information to be recorded is growing due to high-definition video data or high-quality music data. Moreover, the number of pieces of content to be recorded on one optical disc is increasing. The expectation for a larger-capacity optical disc is high.

One of the ways to increase the capacity of optical discs is an optical disc device disclosed in Jpn. Pat. Laid-open Publication No. 2007-220206 (FIGS. 1, 4 and 5): the device divides an optical beam from one beam source into first and second beams, and causes the first and second optical beams to interfere with one another to form microscopic holograms as recording marks, which are piled up in the direction of the thickness of an optical disc, thereby recording information on a plurality of layers inside one recording layer.

During the process of reproducing information, the optical disc device emits an optical beam to an arbitrary emission position inside the recording layer; detects whether there is a recording mark at the position according to the intensity of the reflection from the optical disc; and therefore reproduces information from the recording mark recorded on the recording layer.

SUMMARY OF THE INVENTION

By the way, typical optical disc devices, which are designed to reproduce information from an optical disc containing an information recording layer, have a binary threshold: such typical optical disc devices binarize a reproduction signal RF, which is a signal generated from information recorded on the optical disc, depending on whether the signal level of the reproduction signal RF is higher (High) or lower (Low) than the binary threshold, thereby determining whether there is a recording mark there.

Since a circuit for setting the threshold can be realized by a relatively simple element such as Low Pass Filter (LPF), the binary threshold set in the typical optical disc device is determined such that the period of "High" becomes equal to that of "Low" during a threshold detection period after the reproduction signal RF is binarized.

Since the modulation method applied to the typical optical disc device is designed to make the amount of Direct Current (DC) component of the reproduction signal RF as small as possible, the periods of "High" and "Low" alternately appear for a relatively short period of time, making it possible to appropriately set the binary threshold from the reproduction signal RF of the threshold detection period.

However, the optical discs disclosed in the patent document described above form three-dimensional recording marks in the recording layer. This may cause variation in the intensity of a returning optical beam according to the differences in shape between the recording marks after an optical beam is emitted for reproducing information. If the optical beam is emitted to an area where there is no recording mark, the variation will never arise.

Accordingly, the information reproduction process of the Patent Document 1's optical disc device may cause the reproduction signal RF whose difference in variation between white and black levels is large: the white level means the amplitude level of the reproduction signal RF reproduced from an area where there is a recording mark; the black level means the amplitude level of the reproduction signal RF reproduced from an area where there is no recording mark.

So if the binary threshold, like the typical optical disc device, is determined such that the period of "High" becomes equal to that of "Low," the possibility that the device can not appropriately recognize the binarization (i.e. whether or not there is a recording mark) is high (this is referred to as error rate, hereinafter).

The present invention has been made in view of the above points and is intended to provide an optical information recording device and recording correction calculation method that can reduce the error rate.

In one aspect of the present invention, an optical information recording device, which records recording information by forming on a recording medium a recording mark whose mark length is an integral multiple of a reference mark length according to a recording signal generated from the recording information, includes: a compensation information recording and reproduction section that, after recording compensation recording information by forming the recording mark on the recording medium according to a compensation recording signal generated from the compensation recording information which is the arbitrary recording information, generates a reproduction signal by reading out the compensation recording information from the recording medium; a reproduction clock generation section that generates from the reproduction signal a reproduction clock whose cycle corresponds to the reference mark length; a distribution reference level determination section that sets a signal level suitable for binarization determination of the reproduction signal as a distribution reference level, according to the difference in variation between white and black levels of the reproduction signal; a correction calculation section that calculates a recording correction value for correcting the compensation recording signal, so that the signal level of the reproduction signal becomes closer to the distribution reference level around a target cross timing determined based on the reproduction clock; a recording information recording section that forms the recording mark on the recording medium based on the recording signal generated by correcting a recording information signal generated from the recording information according to the recording correction value.

Accordingly, during a process of reproducing information, as for the reproduction signal generated by reading out the recording information, a binary threshold that allows the period of "High" to become equal to the period of "Low" is set so that it becomes close to the distribution reference level suitable for the binarization determination.

In another aspect of the present invention, a recording correction calculation method that, when recording recording information by forming on a recording medium a recording mark whose mark length is an integral multiple of a reference mark length according to a recording signal generated from a recording information signal, calculates a recording correction value for the recording information signal generated from the recording information, includes: a compensation information recording and reproduction step of, after recording compensation recording information by forming the recording mark on the recording medium according to a compensation recording signal generated from the compensation recording information which is the arbitrary recording information, generating a reproduction signal by reading out the compensation recording information from the recording medium; a reproduction clock generation step of generating from the reproduction signal a reproduction clock whose cycle corresponds to the reference mark length; a distribution reference level determination step of setting a signal level suitable for binarization determination of the reproduction signal as a distribution reference level, according to the difference in variation between white and black levels of the reproduction signal; and a correction calculation step of calculating the recording correction value for correcting the compensation recording signal, so that the reproduction signal becomes closer to the distribution reference level around a target cross timing determined based on the reproduction clock.

Accordingly, during a process of reproducing information, as for the reproduction signal generated by reading out the recording information, a binary threshold that allows the period of "High" to become equal to the period of "Low" is set so that it becomes close to the distribution reference level suitable for the binarization determination.

According to the above device and method, during a process of reproducing information, as for the reproduction signal generated by reading out the recording information, a binary threshold that allows the period of "High" to become equal to the period of "Low" is set so that it becomes close to the distribution reference level suitable for the binarization determination. Thus, the optical information recording device and recording correction calculation method that reduce the error rate can be realized.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.

(1) The Configuration of an Optical Disc Device

Figure 1:
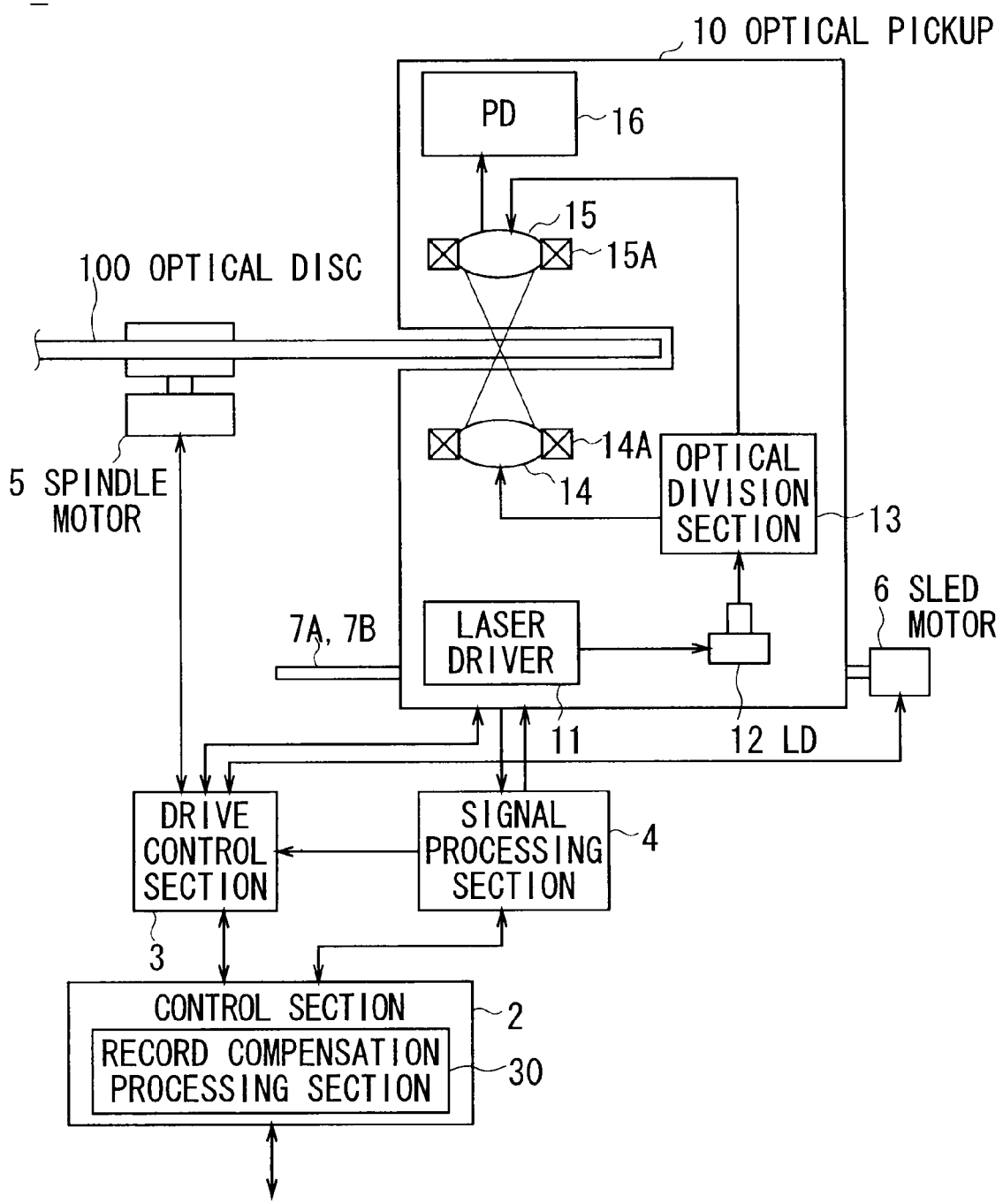
FIG. 1 is a schematic diagram illustrating the configuration of an optical disc device.

With reference to FIG. 1, the reference number 1 denotes an optical disc device as a whole. A control section 2 takes overall control of the device.

The control section 2 includes Central Processing Unit (CPU) and other components (not shown): CPU reads out programs, such as a basic program, an information recording program and a recording correction calculation program from Read Only Memory (ROM), and loads them onto Random Access Memory (RAM), thereby performing processes including an information recording process and a recording correction calculation process.

With an optical disc 100 put in the device, the control section 2, for example, supplies a drive command and recording address information to a drive control section 3 after receiving an information recording command, recording information and the recording address information from an external device or the like (not shown). At the same time, the control section 2 supplies the recording information to a signal processing section 4. Incidentally, the recording address information represents an address of an area of a recording layer 101 of the optical disc 100: the recording information is to be recorded on that area.

The drive control section 3 rotates a spindle motor 5 according to the drive command, thereby rotating the optical disc 100 at a predetermined rotation speed. The drive control section 3 also drives a sled motor 6 to move an optical pickup 10 along moving shafts 7A and 7B in the radial direction of the optical disc 100 (i.e. toward an innermost or outermost part of the optical disc 100), thereby places the optical pickup 10 above a position (an imaginary track) corresponding to the recording address information.

The signal processing section 4 performs such signal processes as a modulation process (1-7PP (Parity preserve/Prohibit repeated minimum transition run-length)) and a predetermined decoding process to the supplied recording information to produce a recording information signal. The signal processing section 4 then produces a recording signal by performing a recording compensation process to the recording information signal, and supplies it to an optical pickup 10.

Figure 2:
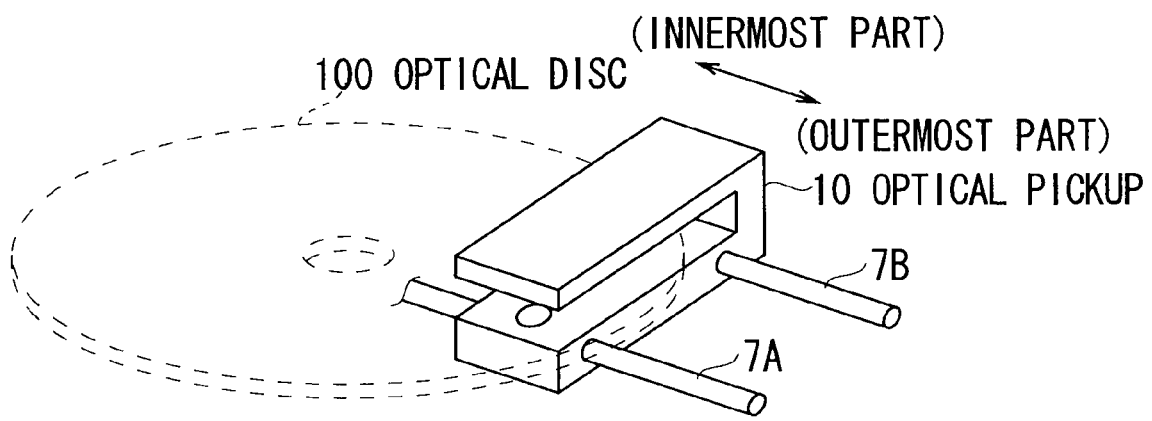
FIG. 2 is a schematic external view of an optical pickup.

As shown in FIG. 2, the optical pickup 10 is substantially formed in a U-shape. This allows the optical pickup 10 to emit recording optical beams L1 to the both surfaces of the optical disc 100 and focus them on the optical disc 100.

Figure 3A:
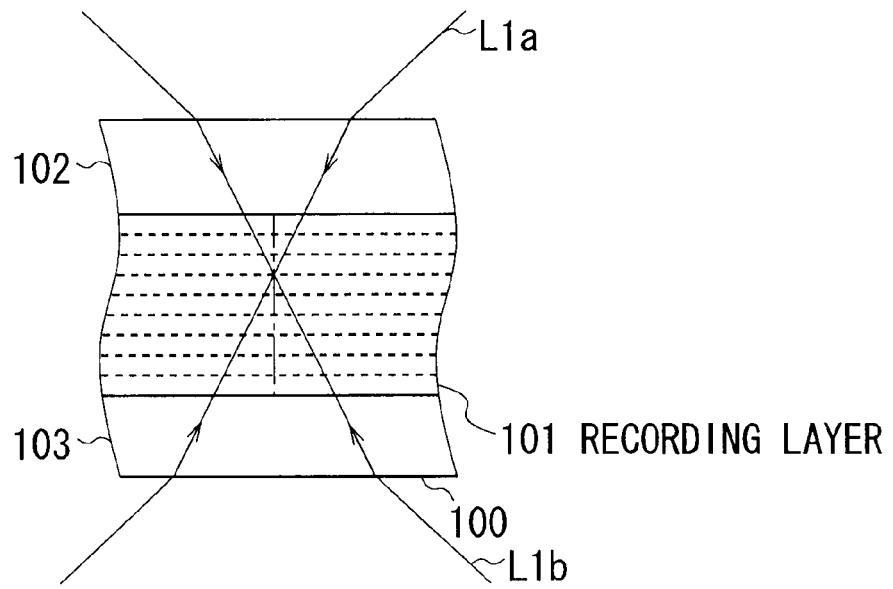
FIGS. 3A and 3B are schematic diagrams illustrating the formation of a recording mark (1)

Like typical CDs, DVDs and BDs, this discoid optical disc 100 is about 120 mm in diameter, and has a hole 100H at its center. As shown in FIG. 3A, which is a cross-section view of the optical disc 100, the optical disc 100 has base plates 102 and 103 and the recording layer 101: the recording layer 101 is sandwiched between the base plates 102 and 103. Recording marks RM are to be recorded on a plurality of layers inside the recording layer 101.

In the optical pickup 10 (FIG. 1), a laser drive 11 supplies to a laser diode 12 a laser drive current according to the recording signal, thereby letting the laser diode 12 emit a recording optical beam L1 (laser beam). A optical division section 13 of the optical pickup 10 divides the recording optical beam L1 into recording optical beams L1a and L1b, which are then led to objective lens 14 and 15, respectively.

Under the control of the drive control section 3, the optical pickup 10 performs a tracking control process in which it drives two-axis actuators 14A and 15B and moves the objective lens 14 and 15 in a tracking direction, which is the radial direction of the optical disc 100. This allows the optical pickup 10 to emit the recording optical beams L1a and L1b to an imaginary track corresponding to the recording address information: the imaginary track is on the recording layer 101 of the optical disc 100.

Moreover, the optical pickup 10 performs a focus control process in which it moves the objective lens 14 and 15 closer to or away from the optical disc 100 (i.e. in a focus direction). This allows the optical pickup 10 to emit the recording optical beams L1a and L1b to an imaginary recording layer corresponding to the recording address information and to focus the recording optical beams L1a and L1b on the same point.

Therefore, a standing wave occurs around the focal point of the recording optical beams L1a and L1b emitted to an arbitrary imaginary track (referred to as target track, hereinafter) of an arbitrary imaginary mark layer of the recording layer 101, thereby forming a hologram, or a recording mark RM.

Figure 3B:
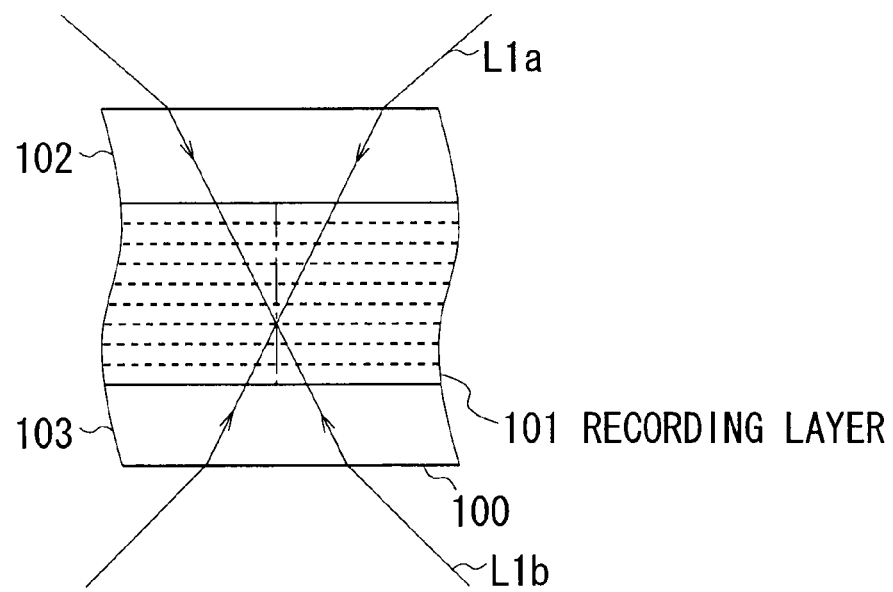

As shown in FIG. 3B, the optical pickup 10 changes the depth of the focal point of the recording optical beams L1a and L1b according to the recording address information, thus forming the recording marks RM on each imaginary mark layer inside the recording layer 101.

Figure 4:
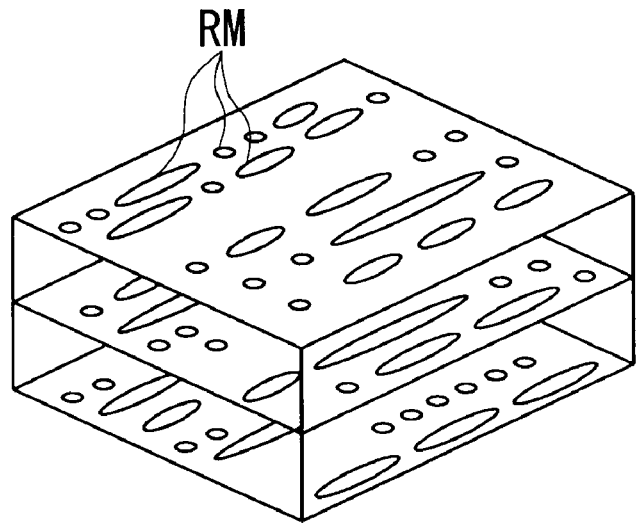
FIG. 4 is a schematic diagram illustrating the formation of a recording mark (2)

As shown in FIG. 4, the mark length (2T to 8T, for example) of the recording mark RM recorded on the recording layer 101 is determined according to the recording signals supplied from the signal processing section 4.

Moreover, for example, the control section 2 supplies to the drive control section 3 a drive command after receiving from an external device (not shown) an information reproduction command and reproduction address information representing an address of an area from which information is to be reproduced. At the same time, the control section 2 supplies a reproduction processing command to the signal processing section 4.

In a similar way to when recording information, the drive control section 3 drives the spindle motor 5 to rotate the optical disc 100 at a predetermined rotation speed. The drive control section 3 also drives the sled motor 6 to place the optical pickup 10 above a point corresponding to the reproduction address information.

Under the control of the drive control section 3 (FIG. 1), the optical pickup 10 performs the focus control process and the tracking control process. This allows the optical pickup 10 to emit a reading optical beam L2 to a track (i.e. a target track) corresponding to the reproduction address information: the track is on the recording layer 101 of the optical disc 100. In this case, the optical pickup 10 emits only the predetermined intensity of the reading optical beam L2 to one surface of the optical disc 100.

Figure 5:
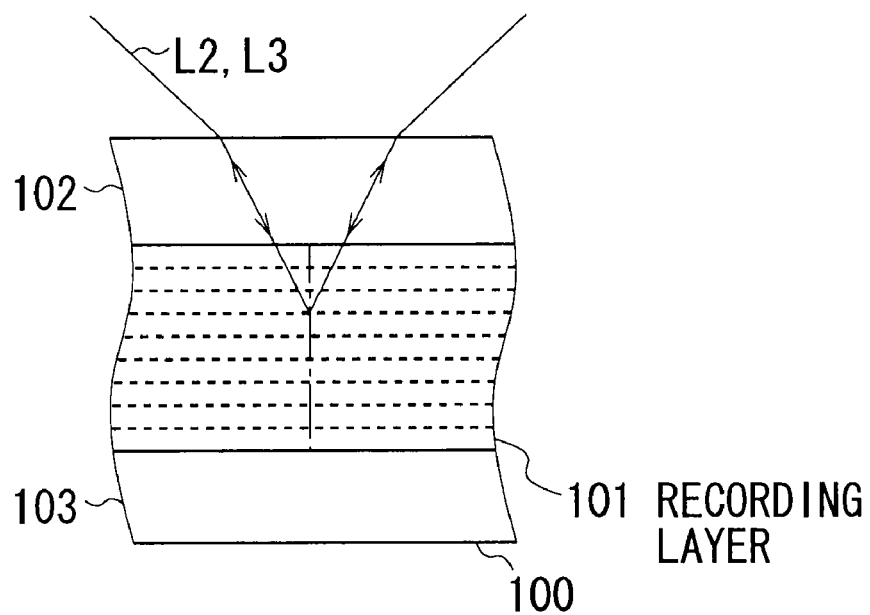
FIG. 5 is a schematic diagram illustrating the reproduction of information.

As shown in FIG. 5, the optical division section 13 of the optical pickup 10 lets only the reading optical beam L2 enter the objective lens 15, which then directs the reading optical beam L2 to the target track of the recording layer 101.

Then, a photodetector 16 (FIG. 1) of the optical pickup 10 receives a reproduction optical beam L3, which emerges from the recording mark RM of the recording layer 101 (FIGS. 3A and 3B) of the optical disc 100. The photodetector 16 then supplies to the signal processing section 4 a detection signal according to the intensity of the beam.

The signal processing section 4 (FIG. 1) reproduces the reproduction signal RF from the supplied detection signal, sets a binary threshold AO such that the periods of "High" and "Low" of the reproduction signal RF become equal to each other, and generates a binary signal from the reproduction signal RF.

The signal processing section 4 then generates reproduction information by performing signal processes, such as a predetermined demodulation process and decoding process, to the binary signal, and supplies the reproduction information to the control section 2. The control section 2 transmits the reproduction information to an external device (not shown).

In that manner, the control section 2 of the optical disc device 1 controls the optical pickup 10 to record information on the target track of the recording layer 101 of the optical disc 100 and reproduce information from the target track.

(2) The Detailed Description of the Recording Correction Calculation Process

As described above, the optical disc device 1 binarizes the reproduction signal RF after setting the binary threshold AO so that the periods of "High" and "Low" becomes equal to each other during the information reproduction process. Accordingly, the optical disc device 1 is designed to record the recording marks RM after correcting their length, so that the switch from "High" to "Low" (or "Low" to "High") of the reproduction signal RF (i.e. zero crossing) can occur upon an arbitrary signal level.

The optical disc device 1 is designed to correct the length of the recording mark RM by performing a recording compensation process in which the recording signal is produced by correcting the recording information signal, which is generated from the recording information, according to a recording correction value during the information recording process. The following describes a recording correction calculation process in which the recording correction value is determined.

Figures 6A, 6B:
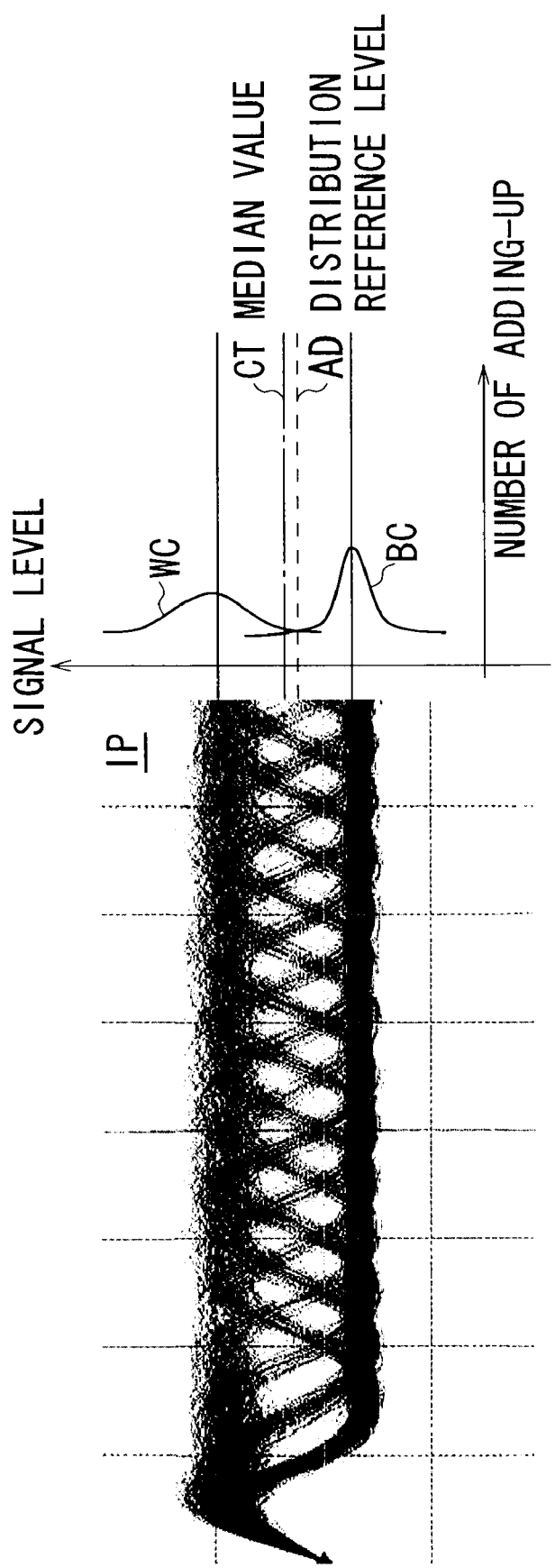
FIGS. 6A and 6B are schematic diagrams illustrating the waveform of a reproduction signal and its variation.

FIG. 6A illustrates an eye pattern IP of the overlapped reproduction signals RF: the reproduction signals RF were generated by the information reproduction process for the optical disc 100 on which the recording marks RM, or holograms, are formed.

The diagram proves that the variation in white level is larger than the variation in black level: the white level is related to the amplitude of the reproduction signal RF generated from an area where there is the recording mark RM regarding the eye pattern IP; the black level is related to the amplitude of the reproduction signal RF generated from an area (i.e. a space SP) where there is no recording mark RM.

FIG. 6B shows distribution curves representing signal levels at which the white and black levels are detected and the result of adding-up (i.e. the rate at which the signal levels appear). A white level distribution curve WC widely spreads across a signal level axis, whereas a black level distribution curve BC concentrates within a narrow area. This means that the variation in white level is large, while the variation in black level is small.

Generally, if the binary threshold AO is set to a median value CT between the average of the white-level signal level and the average of the black-level signal level for binarizing a signal having a difference in variation between the white level and the black level, the possibility that the device can not appropriately determine whether it is "High" or "Low" is high (this is referred to as error rate, hereinafter).

Accordingly, the error rate would rise if the optical disc device had performed the recording compensation process to the median value CT so that the switch from "High" to "Low" (or "Low" to "High") can occur.

Therefore, according to the optical disc device 1 of the present embodiment, the recording correction value is determined so that the reproduction signal RF crosses the zero value when it is at a signal level determined according to the difference in variation between the white and black levels.

When performing the information recording process, the control section 2 (FIG. 1) of the optical disc device 1 controls a recording compensation processing section 30 to perform a recording correction calculation process.

Figure 7:
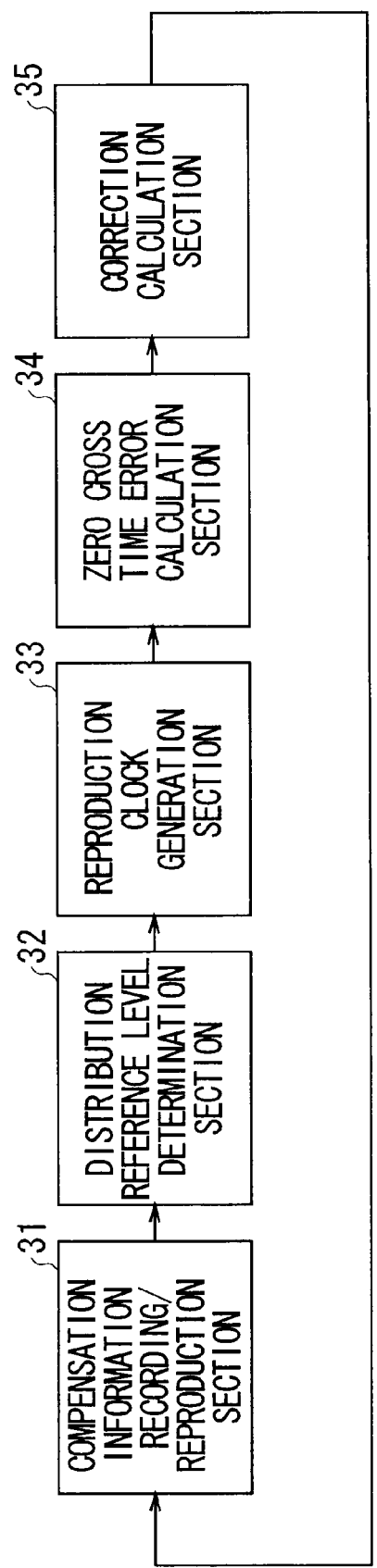
FIG. 7 is a schematic diagram illustrating the configuration of a recording compensation processing section.
Figure 8:
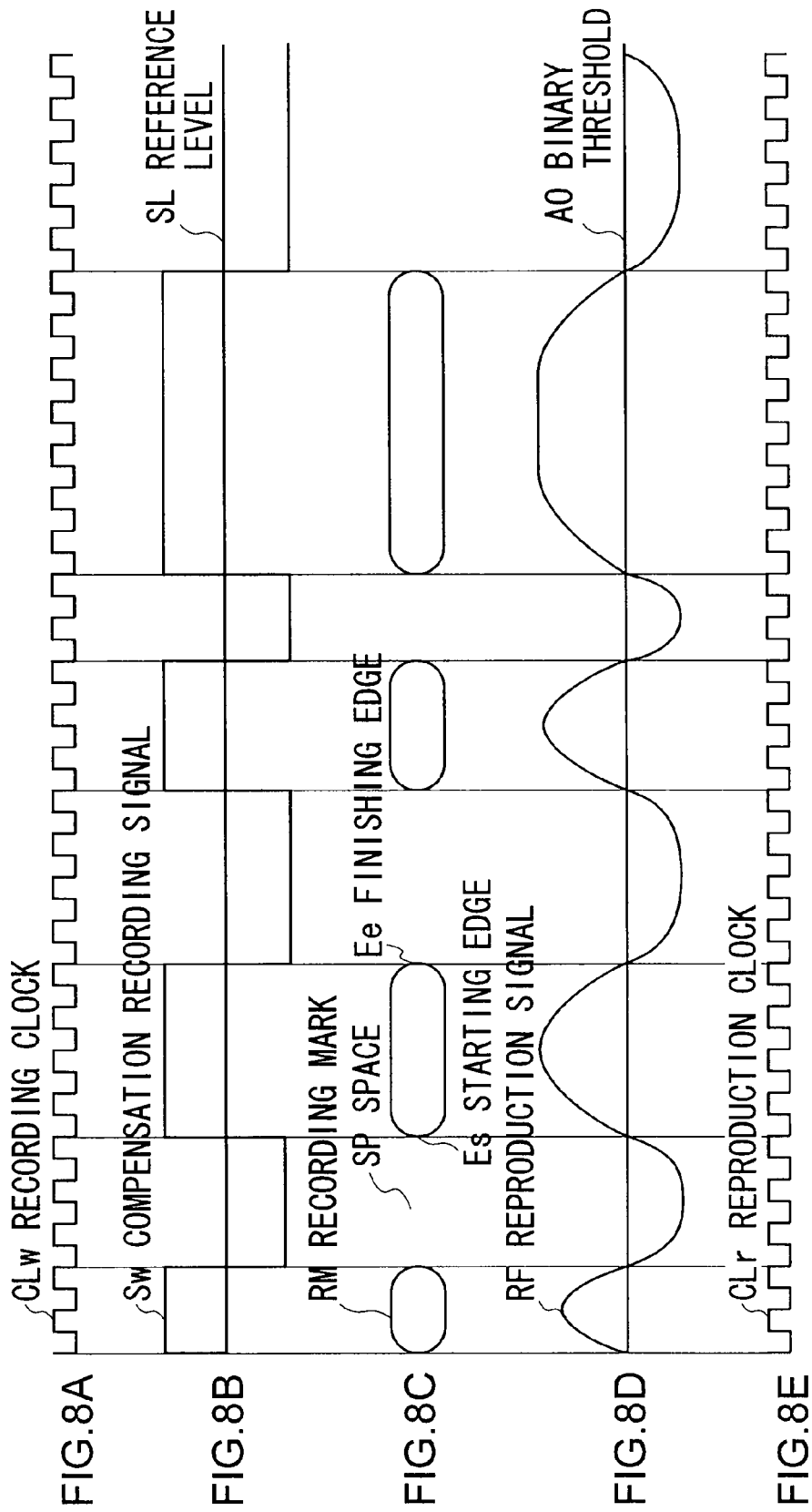
FIGS. 8A to 8E are schematic diagrams illustrating the recording and reproduction of compensation recording information.

As shown in FIG. 7, a compensation information recording/reproduction section 31 of the recording compensation processing section 30, after receiving an information recording command from an external device or the like, reads out from ROM compensation recording information (or recording information), and supplies it to the signal processing section 4. As shown in FIGS. 8A and 8B, the signal processing section 4 generates a compensation recording signal Sw, and supplies it to the compensation information recording/reproduction section 31: the compensation recording signal Sw crosses the zero value, or a reference level SL, at a time when a predetermined recording clock CLw falls.

As shown in FIG. 8C, the compensation information recording/reproduction section 31 forms the recording mark RM in a predetermined compensation recording area of the recording layer 101 according to the compensation recording signal Sw.

Moreover, immediately after recording the compensation recording information, the compensation information recording/reproduction section 31 reads out it from the compensation recording area, and lets the signal processing section 4 generate the reproduction signal RF, as shown in FIG. 8D.

A reproduction clock generation section 32 performs a Phase Locked Loop (PLL) process to the reproduction signal RF, thereby producing a reproduction clock CLr: half a cycle of the reproduction clock CLr is equal to half the length of the mark length 1T, as shown in FIG. 8E. The reproduction clock generation section 32 also causes the reproduction signal RF and the reproduction clock CLr to synchronize with one another. Incidentally, the reproduction clock CLr is produced so that it falls at a time when the reproduction signal RF crosses the zero value, with the binary threshold AO set such that the periods of "High" and "Low" become equal to each other.

A distribution reference level determination section 33 (FIG. 7) detects (or samples) the reproduction signal RF at a black and white detection timing when the reproduction clock CLr rises; determines whether the detected reproduction signal RF is white level or black level according to the signal level of the reproduction signal RF; and then temporarily stores the determined signal level in RAM.

Moreover, the distribution reference level determination section 33 ends the detection of the signal level from the reproduction signal RF after the number of the signal levels stored, for example, reaches a predetermined statistic score. As for the white and black levels, the distribution reference level determination section 33 then expresses the correlation between the signal level and the total number of times when this signal level is detected as a high order function, thereby generating a curve.

In this manner, the distribution reference level determination section 33 can generate the white level distribution curve WC and the black level distribution curve BC. FIG. 6B shows these distribution curves WC and BC on a graph. The degree of the distribution curves WC and BC represents the variation in white and black levels: a gentle curve means a larger variation, whereas a sharp curve represents a smaller variation.

The distribution reference level determination section 33 (FIG. 7) then calculates a distribution reference level AD: the distribution reference level AD is a signal level where the distribution curve WC crosses the distribution curve BC (FIG. 6B). If the variation in white level is larger than the variation in black level, the distribution reference level AD, calculated by the distribution reference level determination section 33, is closer to the black level than to the median value CT.

Therefore, the distribution reference level AD, calculated by the distribution reference level determination section 33 according to the difference in variation between the white and black levels of the reproduction signal RF, is a signal level suitable for the binarization determination of the reproduction signal RF.

Figure 9:
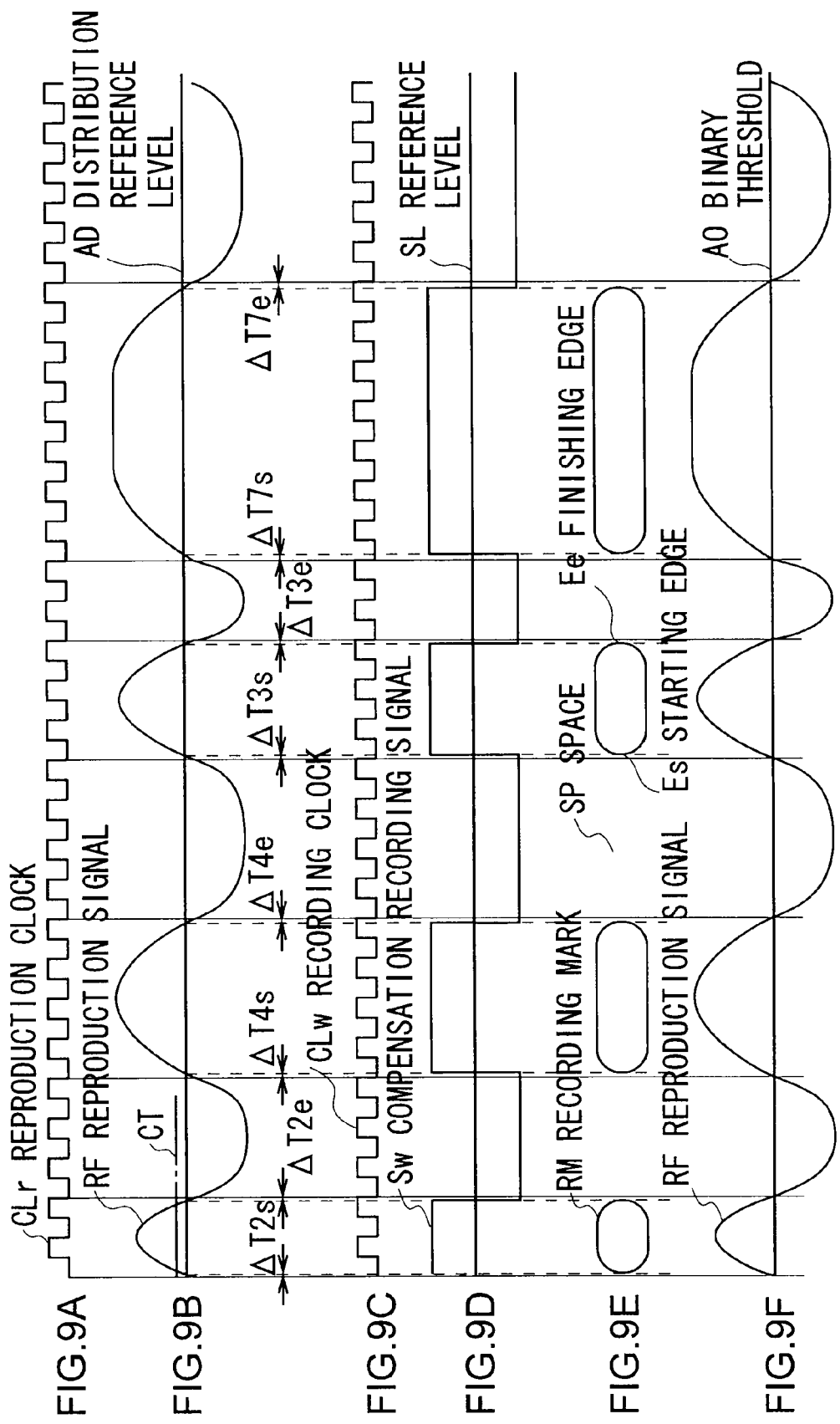
FIGS. 9A to 9F are schematic diagrams illustrating the correction of a recording signal.

As shown in FIG. 9B, a zero cross time error calculation section 34 regards the distribution reference level AD as the reference level (zero), and detects from the reproduction signal RF a timing of zero crossing which corresponds to a starting edge Es of the recording mark RM whose mark length matches the one to be processed (referred to as process target mark length, hereinafter).

Specifically, the zero cross time error calculation section 34 calculates a zero cross time error $\Delta T$ representing the difference between a timing when the reproduction signal RF crosses the distribution reference level AD and a timing (referred to as target cross timing, hereinafter) when the reproduction clock CLr (FIG. 9A) falls. After calculating the zero cross time error $\Delta T$ a predetermined number of times (also referred to as calculation number), the zero cross time error calculation section 34 outputs the average of the calculated zero cross time errors $\Delta T$ as an average time error $A\Delta T$.

Similarly, the zero cross time error calculation section 34 calculates the average time error $A\Delta T$ for the finishing edge Ee of the recording mark RM having the process target mark length. In this manner, the zero cross time error calculation section 34 calculates all the average time errors $A\Delta T$ for the starting and finishing edges Es and Ee of all the mark lengths.

For example, the zero cross time error calculation section 34 detects from the reproduction signal RF a timing when a portion corresponding to the starting edge Es of the recording mark RM (2T mark) whose mark length is 2T (a process target mark length) crosses the zero value, and calculates the average time error $A\Delta T2s$.

Moreover, the zero cross time error calculation section 34 detects from the reproduction signal RF a timing when a portion corresponding to the finishing edge Ee of the recording mark RM whose mark length is 2T crosses the zero value, and calculates the average time error $A\Delta T2e$.

The zero cross time error calculation section 34 changes the process target mark length between 3T and 8T when needed, and performs similar processes, thereby calculating the average time error AΔT3s to AΔT8s and AΔT3e to AΔT8e of the mark lengths 3T to 8T.

In this manner, the zero cross time error calculation section 34 calculates the average time error AΔT for the starting and finishing edges Es and Ee of the recording mark RM of each mark length: the average time error AΔT represents the average of the differences between a timing when the reproduction signal RF crosses the zero value (or the distribution reference level AD) and the target cross timing.

A correction calculation section 35 (FIG. 7) makes a determination as to whether each average time error AΔT (AΔT2s to AΔT8s and AΔT2e to AΔT8e) is less than a predetermined time error threshold. If the average time error AΔT is greater than or equal to the time error threshold, the correction calculation section 35 multiplies the average time error AΔT by a constant value which is less than or equal to 1 (0.8, for example), thereby calculating the record correction value for the compensation recording signal Sw. The correction calculation section 35 supplies it to the compensation information recording/reproduction section 31.

The compensation information recording/reproduction section 31 supplies the compensation recording information and the recording correction value to the signal processing section 4. As shown in FIGS. 9C and 9D, the signal processing section 4 generates the compensation recording signal Sw, and supplies it to the optical pickup 10: the compensation recording signal Sw is a signal that crosses the reference level SL (zero) a certain period of time, which corresponds to the recording correction value, before the recording clock CLw falls.

As shown in FIG. 9E, the compensation information recording/reproduction section 31 controls the optical pickup 10 to form the recording mark RM in the compensation recording area of the recording mark 101 according to the compensation recording signal Sw, and generates the reproduction signal RF from the recording mark RM. Incidentally, for ease of explanation, FIGS. 9D and 9E shows the recording mark RM formed based on the compensation recording signal Sw when the constant value is 1.

The recording compensation processing section 30 repeats similar processes using the reproduction clock generation section 32, the distribution reference level determination section 33, the zero cross time error calculation section 34, and the correction calculation section 35 to calculate the recording correction value according to the compensation recording signal Sw again.

The recording compensation processing section 30 repeats the calculation of the recording correction value until the average time errors AΔT of all the mark lengths, calculated by the correction calculation section 35, become less than the time error threshold.

After the recording compensation processing section 30 recognizes that the average time errors AΔT of all the mark lengths have become less than the time error threshold, the recording compensation processing section 30 ends the calculation of the recording correction value, and then sets the recording correction value in the signal processing section 4 before ending the recording correction calculation process.

In that manner, as shown in FIG. 9F (compared with FIG. 9B), the recording compensation processing section 30 calculates the recording correction value for generating the compensation recording signal Sw that can form the recording mark RM which allows the reproduction signal RF to cross the zero value according to the distribution reference level AD that is set according to the variation in white and black levels.

The signal processing section 4 of the optical disc device 1 then performs the recording compensation process in which the recording signal is generated by correcting the recording information signal, which is based on the recording information supplied from an external device or the like, according to the recording correction value. In this manner, when recording the recording information on the optical disc 100, the optical disc device 1 changes the length of the recording mark RM according to the recording correction value.

This allows the optical disc device 1 to form on the recording layer 101 the recording mark RM that can generate the reproduction signal RF so that it crosses the zero value (or the distribution reference level AD), i.e. the periods of "High" and "Low" become equal to each other.

Figure 10:
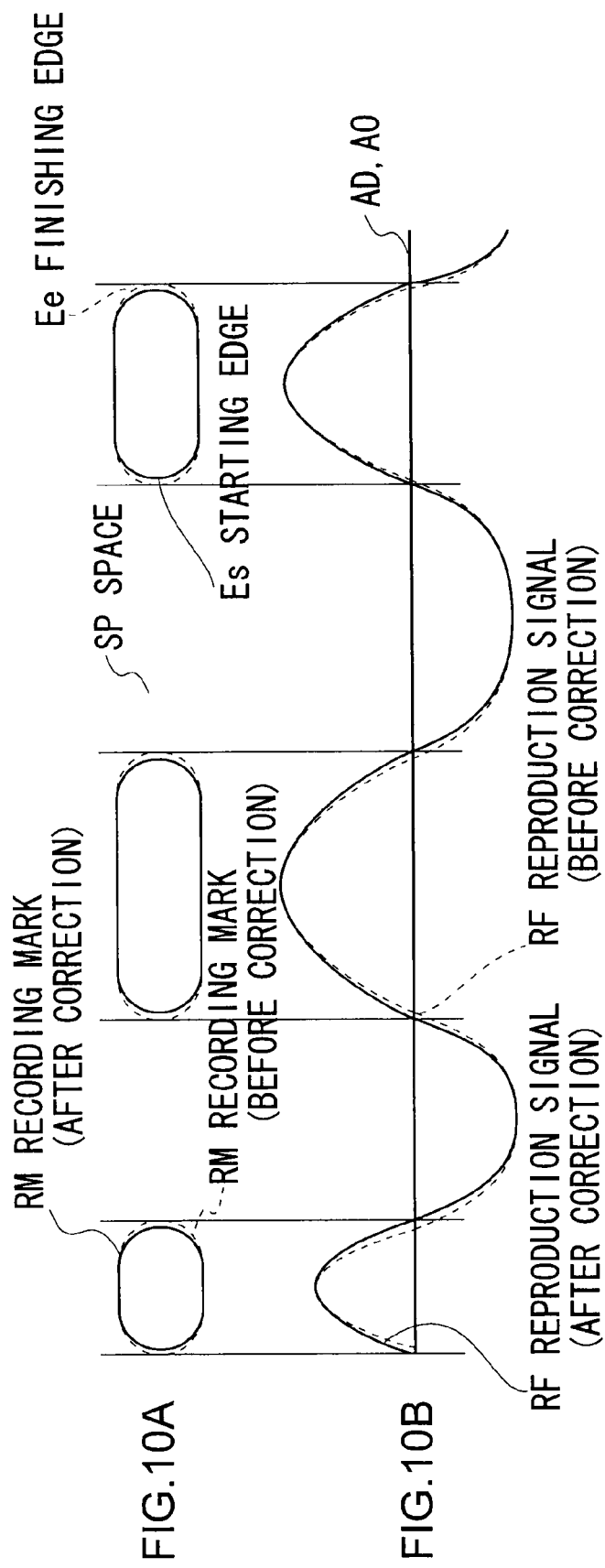
FIGS. 10A and 10B are schematic diagrams illustrating the adjustment of the waveform of a reproduction signal.

In FIG. 10A, the dotted lines represent the length of the recording mark before it is corrected, while the solid lines represent the length of the recording mark after correction. In this manner, the optical disc device 1 corrects the recording information signal according to the recording correction value.

In FIG. 10B, the dotted line represents the reproduction signal RF whose zero-crossing timing does not match the target cross timing, while the solid line shows the reproduction signal RF whose zero-crossing timing matches the target cross timing, at a time when the distribution reference level AD is a point of reference (zero).

Therefore, during the information reproduction process, even though the optical disc device 1 performs a typical process in which the binary threshold AO is set so that the periods of "High" and "Low" become equal to each other during a predetermined threshold setting period, it can set the binary threshold AO around the distribution reference level AD according to the difference in variation between the white and black levels so that it becomes suitable for the binarization determination.

(3) A Recording Correction Calculation Process Procedure

Figure 11:
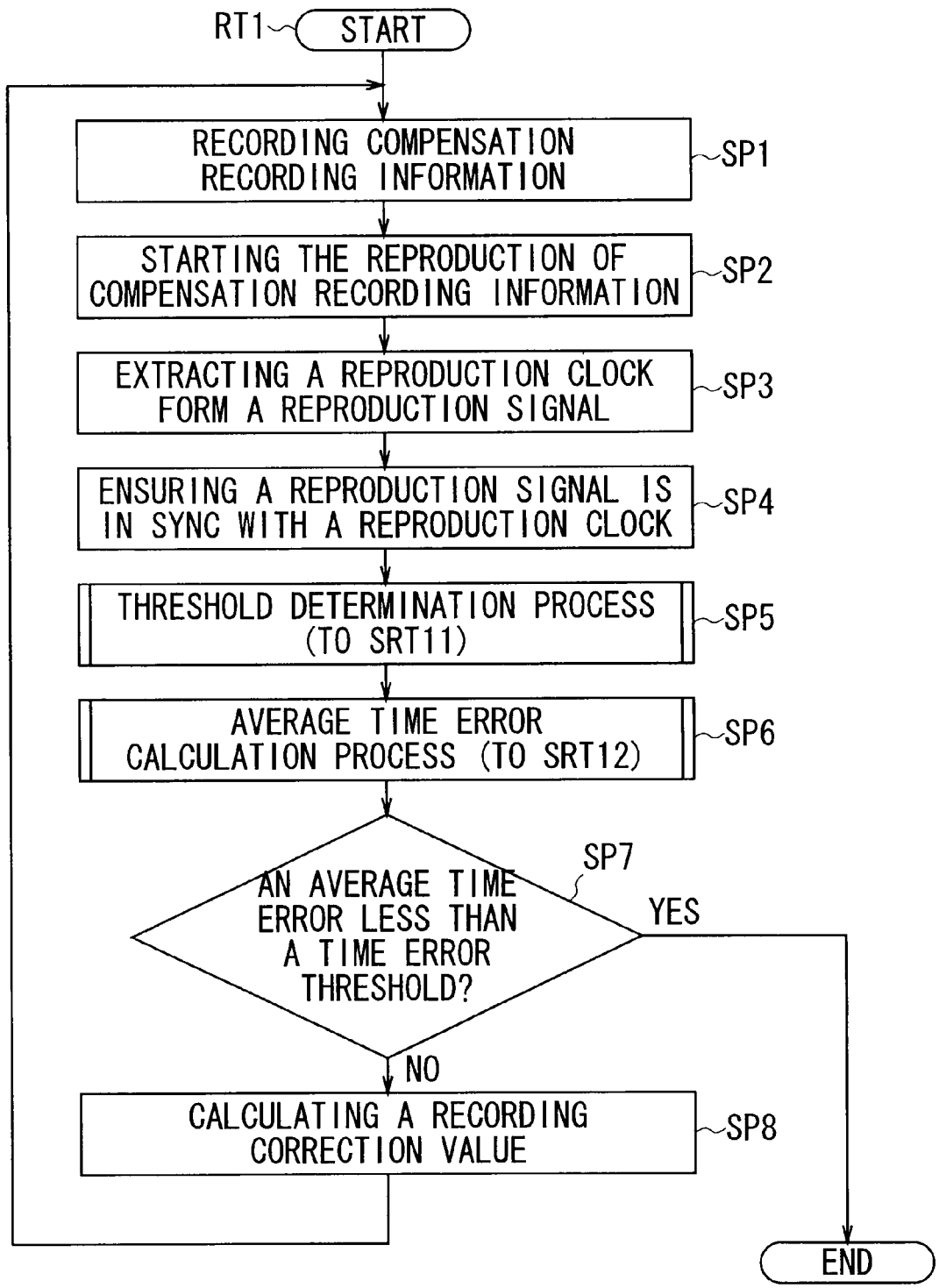
FIG. 11 is a flowchart illustrating the procedure of a recording correction calculation process.
Figure 12:
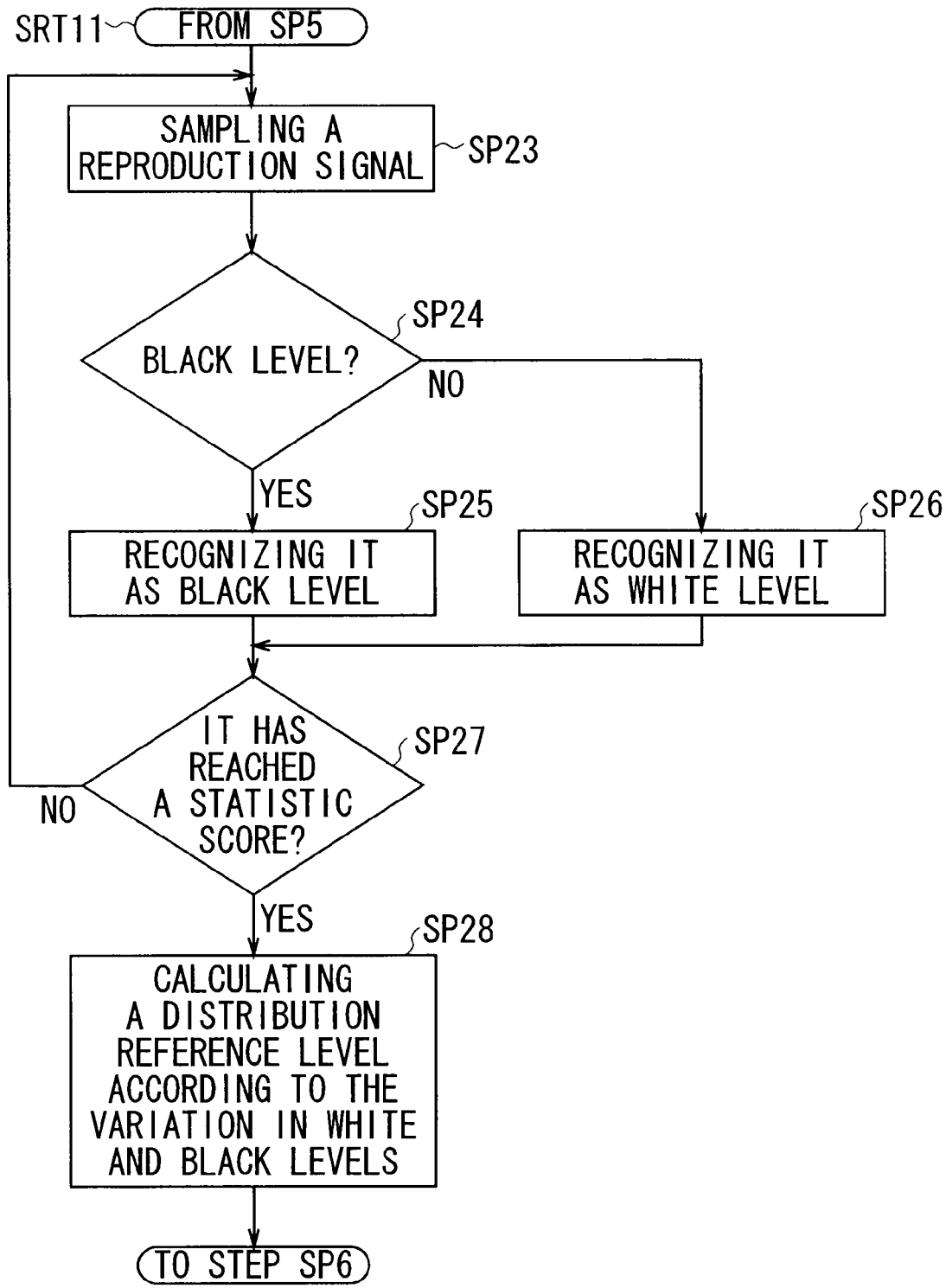
FIG. 12 is a flowchart illustrating the procedure of a threshold determination process.
Figure 13:
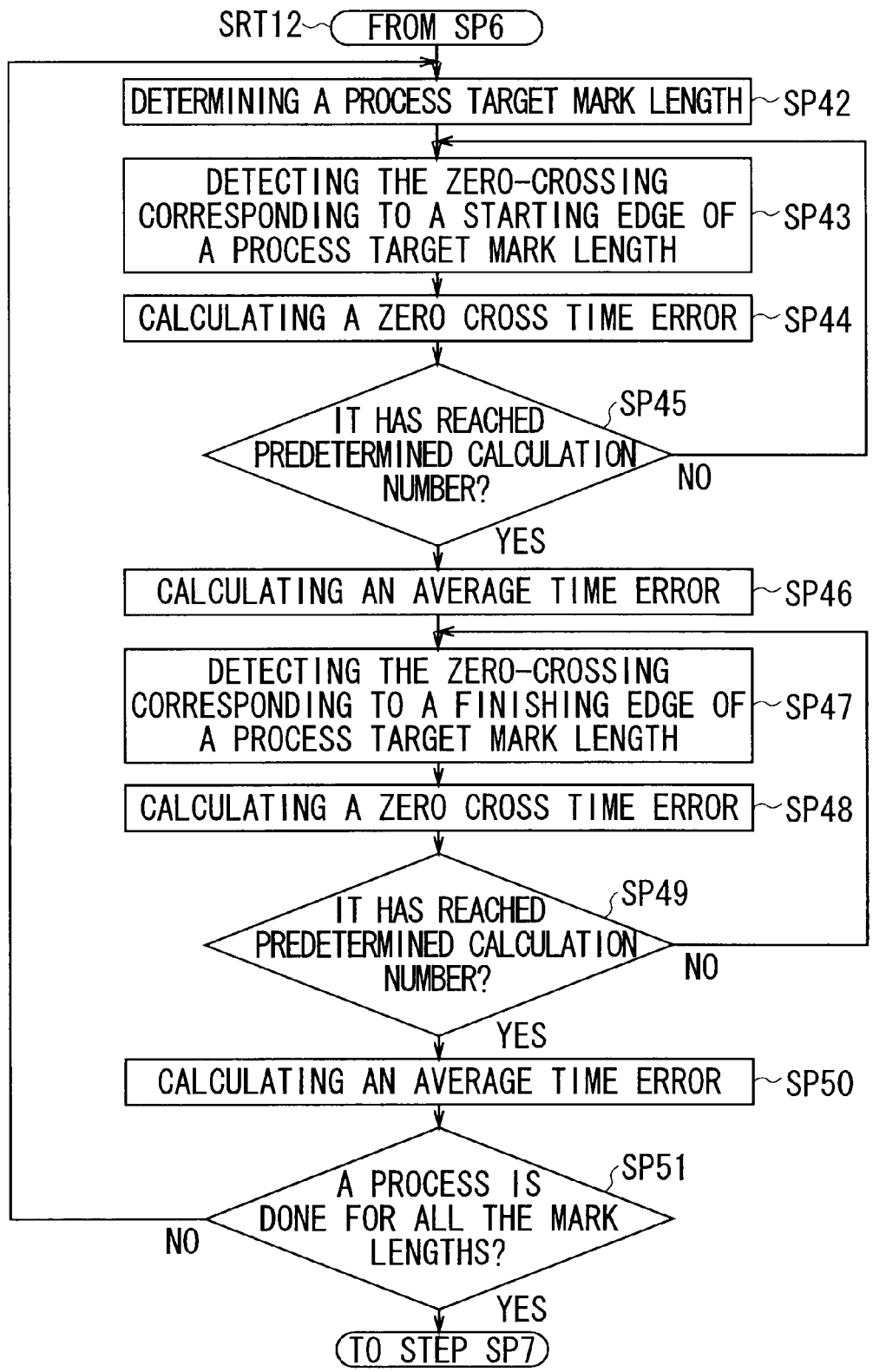
FIG. 13 is a flowchart illustrating the procedure of an average time error calculation process.

The following describes a procedure of the recording correction calculation process, which is performed according to the recording compensation program, with reference to FIGS. 11 to 13.

With reference to FIG. 11, the control section 2 of the optical disc device 1, after starting the information recording process, starts the procedure RT1 of the recording correction calculation process, and proceeds to step SP1.

At step SP1, the control section 2 records the compensation recording information in the predetermined compensation recording area of the recording layer 101 according to the compensation recording information read out from ROM, and proceeds to next step SP2.

At step SP2, the control section 2 reads out the compensation recording information, which was recorded at step SP1, and starts the generation of the reproduction signal RF before proceeding to step SP3.

At step SP3, the control section 2 starts extracting the reproduction clock CLr from the reproduction signal RF, and then proceeds to next step SP4.

At step SP4, the control section 2 causes the reproduction signal RF and the reproduction clock CLr to synchronize with each other, and then proceeds to next step SP5. While performing the subsequent processes, the extraction of the reproduction clock CLr from the reproduction signal RF and the synchronization for the reproduction signal RF and the reproduction clock CLr continue.

At step SP5, the control section 2 proceeds to step SP23 of a subroutine SRT11, and starts a procedure of a threshold determination process (FIG. 12) in which the distribution reference level AD is determined according to the variation in white and black levels of the reproduction signal RF.

At step SP23, the control section 2 detects, or samples, the signal level of the reproduction signal RF at the black and white detection timing when the reproduction clock CLr rises, and then proceeds to next step SP4.

At step SP24, the control section 2 makes a determination as to whether the reproduction signal RF sampled at step SP23 is black level. If the affirmative result is obtained, the control section 2 recognizes the signal level of the reproduction signal RF as black level, and temporarily stores the signal level in RAM before proceeding to next step SP25.

If the negative result is obtained at step SP24, the control section 2 recognizes the signal level of the reproduction signal RF sampled at step SP23 as white level, and temporarily stores the signal level in RAM before proceeding to next step SP26.

At step SP26, the control section 2 makes a determination as to whether it has sampled the signal level of the reproduction signal RF a predetermined number of times (the predetermined statistic score). If the negative result is obtained, the control section 2 returns to step SP23 and continues the process.

If the affirmative result is obtained at step SP25, the control section 2 proceeds to next step SP28, and generates the white level distribution curve WC and the black level distribution curve BC from the black-level and white-level signal levels of the reproduction signal RF stored in RAM. Moreover, the control section 2 calculates the point where the distribution curve WC crosses the distribution curve WB as the distribution reference level AD, before ending the procedure SRT11 of the threshold determination process. The control section 2 subsequently proceeds to step SP6 of the procedure RT1 of the recording correction calculation process (FIG. 11).

At step SP6, the control section 2 proceeds to step SP42 of a subroutine SRT12 (FIG. 13) to perform an average time error calculation process to calculate the average time error AΔT, which is the average of the differences in time between a zero-cross timing of the reproduction signal SF and the target cross timing, with the distribution reference level AD regarded as a point of reference (zero).

At step SP42, the control section 2 determines the process target mark length, which is the mark length of the one to be processed, and proceeds to next step SP43.

At step SP43, the control section 2 detects, as time, the zero-cross timing of the reproduction signal RF corresponding to the starting edge Es of the process target mark length, and proceeds to next step SP44.

At step SP44, the control section 2 calculates the zero cross time error ΔT representing the difference between the zero-cross timing detected at step SP43 and the target cross timing when the reproduction clock CLr falls, and temporarily stores the zero cross time error ΔT in RAM before proceeding to next step SP45.

At step SP45, the control section 2 makes a determination as to whether it has calculated the zero cross time error ΔT for the starting edge Es of the process target mark length the predetermined number of times (the predetermined calculation number). If the negative result is obtained, the control section 2 returns to step SP43 to continue the calculation of the zero cross time error ΔT.

If the affirmative result is obtained at step SP45, the control section 2 proceeds to next step SP46, and calculates the average time error AΔT, which is the average of the zero cross time errors ΔT for the starting edge Es of the process target mark length, before proceeding to step SP47.

At step SP47, the control section 2 detects, as time, the zero-cross timing of the reproduction signal SF corresponding to the finishing edge Ee of the process target mark length, and proceeds to next step SP48.

At step SP48, the control section 2 calculates the zero cross time error ΔT representing the difference between the zero-cross timing detected at step SP47 and the target cross timing, and temporarily stores the zero cross time error ΔT in RAM before proceeding to next step SP49.

At step SP49, the control section 2 makes a determination as to whether it has calculated the zero cross time error ΔT for the finishing edge Ee of the process target mark length the predetermined number of times (the predetermined calculation number). If the negative result is obtained, the control section 2 returns to step SP47 to continue the calculation of the zero cross time error ΔT.

If the affirmative result is obtained at step SP49, the control section 2 proceeds to next step SP50, and calculates the average time error AΔT, which is the average of the zero cross time errors ΔT for the finishing edge Ee of the process target mark length, before proceeding to next step SP51.

At step SP51, the control section 2 makes a determination as to whether it has done those processes for all the mark lengths. If the negative result is obtained, the control section 2 returns to step SP42, sets an unprocessed mark length as the process target mark length, and continues the processes.

If the affirmative result is obtained at step SP51, the control section 2 ends the procedure SRT12 of the average time error calculation process, and proceeds to step SP7 of the procedure RT1 of the recording correction calculation process (FIG. 11).

At step SP7, the control section 2 makes a determination as to whether the average time errors AΔT of all the mark lengths are less than the predetermined time error threshold. If the negative result is obtained, the control section 2 returns to next step SP8, calculates the recording correction value from the average time errors AΔT, and then sets it in the signal processing section 4. The control section 2 subsequently returns to step SP1 to repeat the processes.

If the affirmative result is obtained at step SP8, the control section 2 proceeds to an end step to end the recording correction calculation process.

(4) Operation and Effect

With the configuration described above, the optical disc device 1 records the recording information by forming the recording marks RM on the optical disc 100 (the recording medium) according to the recording signal generated from the recording information: the mark length of the recording mark RM ranges from 2T to 8T, which are an integral multiple of the reference mark length (1T).

Moreover, when performing the recording correction calculation process in which the recording correction value for the recording information signal is calculated, the optical disc device 1 records the compensation recording information by forming the recording mark RM on the optical disc 100 according to the compensation recording signal Sw generated from the compensation recording information, which is the arbitrary recording information that has been previously stored in ROM, and then generates the reproduction signal RF by reading out the compensation recording information from the optical disc 100.

Furthermore, the optical disc device 1 generates, as the reproduction clock CLr whose cycle corresponds to 1T, the reproduction clock CLr from the reproduction signal RF: one cycle of the generated reproduction clock CLr, or the period of time from when it rises until it falls, corresponds to 1T. The optical disc device 1 also regards the point where the distribution curve WC representing the variation in white level crosses the distribution curve BC representing the variation in black level as the distribution reference level AD. In this manner, the optical disc device 1 calculates the distribution reference level AD, which is suitable for the binarization determination of the reproduction signal RF, according to the difference in variation between the white and black levels of the reproduction signal RF.

Furthermore, the optical disc device 1 calculates the recording correction value, which is used for correcting the compensation recording signal Sw so that the reproduction signal RF becomes closer to the distribution reference level AD at the target cross timing when the reproduction clock CLr falls.

During the information recording process, the optical disc device 1 therefore forms the recording marks RM on the optical disc 100 according to the recording signals that are generated by correcting the recording information signal generated from the recording information based on the recording correction value.

Accordingly, in the optical disc device 1, the signal level of the reproduction signal RF becomes close to the distribution reference level AD so that the period of "High" becomes equal to the period of "Low." Accordingly, during the information reproduction process, the binary threshold AO set by the optical disc device 1 is close to the distribution reference level AD according to the difference in variation between the white and black levels, therefore lowering the error rate.

In that manner, the optical disc device 1 actually records the compensation recording information on the optical disc 100, and calculates the recording correction value that can correct the compensation recording signal Sw so that the binary threshold AO for the acquired reproduction signal RF becomes the distribution reference level AD. Specifically, the optical disc device 1 corrects the recording signal along the time axis to correct the length of the recording mark RM, and adjusts the waveform of the reproduction signal RF along the time axis. As a result, the period of "High" becomes equal to the period of "Low" when a point of reference is the distribution reference level AD.

When recording the recording information on the optical disc 100, the optical disc device 1 performs the recording compensation process in which the recording information signal generated from the recording information is corrected according to the recording correction value to generate the recording signal. As a result, the signal level of the reproduction signal RF becomes close to the distribution reference level AD so that the period of "High" becomes equal to the period of "Low."

Therefore, in a similar way to that of a typical optical disc device, the binary threshold AO set in the optical disc device 1 that reproduces information from the optical disc 100 is the signal level of the reproduction signal SF that allows the period of "High" to be equal to the period of "Low," thereby simplifying the configuration of the optical disc device 1.

Generally, the information reproduction process is performed more frequently than the information recording process. So the information reproduction process should be swiftly started. What the optical disc device 1 has to do is only setting the binary threshold AO. Therefore, as for the information reproduction process, the process of setting the binary threshold AO can be simplified. Accordingly, it does not take much time for the optical disc device 1 to start the information reproduction process, compared with an optical disc device that sets the binary threshold AO according to the variation in white and black levels during the information reproduction process.

Furthermore, a typical optical disc device needs to perform a recording compensation process in order to deal with the variation in recording characteristics of the recording layer 101 of the optical disc 100. Whereas the optical disc device 1 can lower the error rate by a simple process in which the recording compensation process is used to correct the length of the recording mark RM so that it will set the binary threshold value AO according to the variation in white and black levels when performing the information reproduction process.

Moreover, the distribution reference level AD set by the optical disc device 1 is the point where the distribution curve WC crosses the distribution curve BC: the distribution curve WC represents the correlation between the white-level signal level and the rate at which this signal level appears, while the distribution curve WB represents the correlation between the black-level signal level and the rate at which this signal level appears.

Accordingly, the distribution reference level AD set by the optical disc device 1 is the signal level that is determined based on the variation in white level and the variation in black level and is suitable for the binarization determination. Therefore, the binary threshold AO set during the information reproduction process is close to the signal level suitable for lowering the error rate.

Furthermore, the optical disc device 1 detects the signal level at a time when the reproduction clock CLr rises as the signal level of the white or black level. Accordingly, compared with a method in which the top of a peak is detected to detect the signal level of the white or black level, this process of detecting the signal level of the white or black level is simple.

Moreover, the optical disc device 1 calculates the recording correction value from the average time error $A\Delta T$, which is the average of the zero cross time errors $\Delta T$: the zero cross time error $\Delta T$ represents the difference between the zero-cross timing when the reproduction signal RF becomes the distribution reference level AD and the target cross timing. In this manner, the recording correction value is calculated from the zero cross time errors $\Delta T$.

Accordingly, the optical disc device 1 can correct the parts of the recording signal, which correspond to the starting edge Es and the finishing edge Ee, along the time axis, thereby adjusting the waveform of the reproduction signal RF corresponding to the starting edge Es and the finishing edge Ee along the time axis.

Furthermore, if the average time error $A\Delta T$ is less than the time error threshold, the optical disc device 1 calculates the recording correction value; if the average time error $A\Delta T$ is greater than or equal to the time error threshold, the compensation information recording/reproduction section 31 corrects the compensation recording signal Sw according to the recording correction value, and performs the recording and reproducing of the compensation recording information.

Accordingly, the optical disc device 1 can continue the recording compensation process until the reproduction signal RF actually crosses the zero value around the distribution reference level AD. Therefore, during the information reproduction process, the optical disc device 1 ensures that the binary threshold AO of the reproduction signal RF is set near the distribution reference level AD.

Moreover, the optical disc device 1 calculates the recording correction value by multiplying the average time error $A\Delta T$ by the arbitrary constant value which is less than or equal to 1.

Here, while generating the reproduction clock CLr from the reproduction signal RF, the optical disc device 1 generates the compensation recording signal Sw according to a predetermined recording clock CLw. This means that the reproduction clock CLr is not the same as the recording clock CLw. Accordingly, if the zero cross time error $\Delta T$ is used as the recording correction value, this value could be larger than necessary.

Moreover, the optical disc device 1 is designed to correct the positions of the edges of the marks to be recorded at once. Accordingly, the magnitude of the interference between adjoining edges (i.e. the interference between symbols) could vary before and after correction. As a result, the correction could be overdone beyond the expectation. The optical disc device 1 calculates the recording correction value for both the starting and finishing edges Es and Ee. Accordingly, as for both the starting and finishing edges Es and Ee of one mark length, if the recording correction value set by the device is the one that shortens the mark length, this recording correction value may be too large because the correction of the position of the one could affect the correction of the position of the other.

Accordingly, the optical disc device 1 multiplies the average time error $A\Delta T$ by the arbitrary constant value which is less than or equal to 1. This prevents the reoccurrence of the process, thereby eliminating divergence. Accordingly, the optical disc device 1 can swiftly calculate the recording correction value because it does the process fewer times.

According to the above configuration, the optical disc device 1 records information by actually forming the recording mark RM on the optical disc 100, reproduces information from the optical disc to generate the reproduction signal RF, and generates the reproduction clock CLr from the reproduction signal RF. Moreover, the optical disc device 1 sets the binarization-determination signal level, which should be set according to the variation of the reproduction signal RF, as the distribution reference level AD; calculates the recording correction value for the compensation information signal to adjust the waveform of the reproduction signal RF so that the parts of the reproduction signal RF which correspond to the edges E cross the distribution reference level AD around the timing when the reproduction clock CLr falls; generates, during the information recording process, the recording signal by correcting the recording information signal according to the recording correction value; and then corrects the length of the recording mark RM. Therefore, during the information reproduction process, the optical disc device 1 ensures that the reproduction signal RF crosses the distribution reference level AD around the timing when the reproduction clock CLr falls. Accordingly, the binary threshold AO set by the device is close to the distribution reference level AD. Thus, an optical information recording device and recording correction calculation method that lower the error rate can be realized.

(5) Other Embodiments

In the above-noted embodiment, the calculation of the recording correction value is done for both the starting and finishing edges Es and Ee. However, the present invention is not limited to this. For example, the calculation of the recording correction value may be performed for eigher the starting edge Es or the finishing edges Ee.

Moreover, in the above-noted embodiment, the calculation of the recording correction value is done for each mark length. However, the present invention is not limited to this. The recording correction value may be performed for each combination of the mark length and the length of the space. This allows the device to perform the recording compensation process more precisely.

The following describes a case in which to record signals, the device uses a modulation method in which the minimum mark length and the minimum space are 2T. If the device calculates the recording correction value using the combinations relying only on three clocks before and after the edge E, there are four combinations: the mark of more than 3T with the space of more than 3T, the mark of more than 3T with the space of 2T and the next mark, the previous mark with the mark of 2T and the space of 3T, the previous space with the mark of 2T and the space of 2T and the next mark. The device calculates the recording correction values for these combinations. If it relies on four clocks, the device calculates the recording correction value for the combinations of the marks and spaces which are greater than or equal to 2T, 3T and 4T.

Accordingly, this method can reduce the amount of the compensation recording information required, compared with a method in which the calculation of the recording correction value is performed for all the combinations of the mark lengths and the lengths of the spaces. This can reduce the time required for the recording correction calculation process.

Furthermore, in the above-noted embodiment, the distribution reference level is determined according to the reproduction signals RF corresponding to all the mark lengths (2T to 8T) of the recording mark RM. However, the present invention is not limited to this. For example, if the white and black levels corresponding to the 2T mark and the 2T space are way different from other mark lengths, the distribution reference level may be determined without them. Even in this case, since it can calculate the recording correction value of the 2T mark and perform the recording compensation process, the device can offer the same effect as the above-noted embodiment.

Furthermore, in the above-noted embodiment, the black and white detection timing is a time when the reproduction clock Clr rises; the target cross timing is a time when the reproduction clock CLr falls. However, the present invention is not limited to this. The target cross timing could be a time when the reproduction clock Clr rises; the black and white detection timing may be a time when the reproduction clock CLr falls.

Furthermore, in the above-noted embodiment, the device generates, while generating the reproduction signal SF, the reproduction clock CLr, and, at the same time, detects the white and black levels to calculate the distribution reference level. However, the present invention is not limited to this. For example, the device may temporarily store in RAM the reproduction signal RF and the reproduction clock CLr while generating the reproduction signal RF and the reproduction clock CLr; and, while reading out the reproduction signal RF and the reproduction clock CLr so that they remain in sync with one another, calculate the distribution reference level by detecting the white and black levels. The same holds for the calculation of the average time error $A\Delta T$.

Furthermore, in the above-noted embodiment, after calculating the average time error $A\Delta T$ for the starting edge Es of one mark length, the device calculates the average time error $A\Delta T$ for the finishing edge Ee of that mark length, and then starts the calculation of the average time error $A\Delta T$ for the subsequent mark length. However, the present invention is not limited to this. The device may calculate the average time errors $A\Delta T$ for the edges E of the mark lengths at once according to the recording pattern of the compensation recording information.

Furthermore, in the above-noted embodiment, the optical disc device 1 forms the hologram on the recording layer 101 of the optical disc 100 as the recording mark RM. However, the present invention is not limited to this. The following is another example: on the recording layer 101, the holograms have been previously formed; the device emits the optical beam to the recording layer 101 to destroy the holograms, therefore forming the recording marks. Another example is that the device emits the optical beam to form an air bubble as the recording mark.

Even in such cases, they are three-dimensional recording marks, probably causing the variation in white and black levels as for the optical beam modulated by the recording mark. Therefore, the device can offer the same effect as the above-noted embodiment.

Furthermore, in the above-noted embodiment, the optical disc 100 is a volume-type recording medium on which three-dimensional recording marks are formed. However, the present invention is not limited to this. The optical disc 100 may be a typical recording medium, such as BD and DVD, which includes an information recording layer: the recording marks are formed by changing the reflectance of the information recording layer. The above-described methods can be applied to all types of optical information recording device that record information an optical medium that could cause the variation in white and black levels of the reproduction signal RF.

Furthermore, in the above-noted embodiment, the device records the compensation recording information, which has been previously stored in ROM. However, the present invention is not limited to this. For example, the compensation recording information may be the recording information supplied from the external device.

Furthermore, in the above-noted embodiment, as the reproduction clock whose cycle corresponds to the reference mark length, the reproduction clock CLr whose one cycle corresponds to 1T mark is generated. However, the present invention is not limited to this. For example, the reproduction clock Clr whose cycle, which corresponds to half the reference mark length, corresponds to 1T mark may be generated: the two cycles correspond to the length of 1T.

Furthermore, in the above-noted embodiment, the distribution reference level AD is the point where the white-level distribution curve WC crosses the black-level distribution curve BC. However, the present invention is not limited to this. Other methods can be applied to the calculation of the signal level suitable for the binarization determination of the reproduction signal, according to the difference in variation between the white and black levels.

Furthermore, in the above-noted embodiment, the device calculates the recording correction value based on the zero cross time error $\Delta T$, which is the difference in time between the target cross timing and the distribution reference level. However, the present invention is not limited to this. For example, the device may calculate the recording correction value according to the difference between the distribution reference level and the signal level of the reproduction signal SF at the target cross timing.

Furthermore, in the above-noted embodiment, the device calculates the recording correction value by multiplying the average time error $A\Delta T$ by the arbitrary constant value. However, the present invention is not limited to this. For example, the average time error $A\Delta T$ may be the recording correction value. It is also possible to multiply it by a constant value or coefficient which is determined according to the value of the average time error $A\Delta T$. Moreover, the device may multiply the average time error $A\Delta T$ by constant values in succession, and regard the average of the resultant values as the recording correction value.

Furthermore, in the above-noted embodiment, the process of step SP1 to SP6 is repeated until the average time error $A\Delta T$ becomes less than the time error threshold. However, the present invention is not limited to this. The device may proceed from step SP6 to step SP8, calculate the recording correction value, and then end the recording correction calculation process.

Furthermore, in the above-noted embodiment, the device records information using a modulation method in which there are the lengths of 2T to 8T for the reference mark length 1T. However, the present invention is not limited to this. The modulation method applied to the recording device for example could have the lengths of 3T to 14T.

Furthermore, in the above-noted embodiment, the same recording device includes both the function of a recording device that records the compensation recording information and the function of a reproduction device that reproduces the recorded compensation recording information. However, the present invention is not limited to this. One device may have either the function of a recording device that records the compensation recording information or the function of a reproduction device that reproduces the recorded compensation recording information. For example, the following describes a case in which the information has been previously recorded on the optical disc 100 at a factory: the recording device can be an expensive, high-quality recording machine, and the reproduction device may be an inexpensive reproduction machine that users can afford; therefore, the recording compensation can be realized so that it is suitable for the characteristics of the inexpensive reproduction devices that users will use.

Furthermore, the recording correction value calculated by the above-noted method may be previously stored in other recording devices that do not have recording correction processing sections.

Furthermore, in the above-noted embodiment, the optical disc 100 used for calculating the recording correction value is the same as the one on which information is actually recorded according to the recording correction value. However, the present invention is not limited to this. The optical disc 100 used for calculating the recording correction value may be different from the one on which the desired information is actually recorded according to the calculated recording correction value.

In such cases, if quality control succeeds in reducing the number of anomalies in the recording media, even the use of the previously-calculated recording correction in other recording devices and media can substantially offer the same effect. Compared with the method in which the device calculates the correction values each time it performs the recording process, the device performs the calculation of the recording correction value fewer times. Therefore, the device can swiftly start the information recording process.

Furthermore, in the above-noted embodiment, the optical disc 100 on which the holograms are recorded as the recording marks RM is a discoid disc. However, the present invention is not limited to this. For example, the device may use a cubic optical information recording medium to record the recording marks RM.

Furthermore, in the above-noted embodiment, the optical disc device 1 (an optical information recording device) includes the compensation information recording/reproduction section 31 (a compensation information recording and reproduction section), the reproduction clock generation section 32 (a reproduction clock generation section), the distribution reference level determination section 33 (a distribution reference level determination section), the zero cross time error calculation section 34 and the correction calculation section 35 (both as a correction calculation section). However, the present invention is not limited to this. The optical information recording device can be configured in a different manner, so that it includes the compensation information recording and reproduction section, the reproduction clock generation section, the distribution reference level determination section, and the correction calculation section.

The above-described methods can be applied to a recording medium on which music content, video content and other kinds of data are recorded.

It should be understood by those skilled in the art that various modifications, combinations, sub-combinations and alterations may occur depending on design requirements and other factors insofar as they are within the scope of the appended claims or the equivalents thereof.

What is claimed is:

1. An optical information recording device that records recording information by forming on a recording medium a recording mark whose mark length is of plural types and is an integral multiple of a reference mark length according to a recording signal generated from the recording information, comprising:

a compensation information recording and reproduction section that, after recording compensation recording information by forming the recording mark on the recording medium according to a compensation recording signal generated from the compensation recording information which is an arbitrary recording information, generates a reproduction signal by reading out the compensation recording information from the recording medium;

a reproduction clock generation section that generates from the reproduction signal a reproduction clock whose cycle corresponds to the reference mark length;

a distribution reference level determination section that sets a signal level suitable for binarization determination of the reproduction signal as a distribution reference level, according to the difference in variation between white and black levels of the reproduction signal;

a correction calculation section that calculates a correction value for correcting the compensation recording signal as a recording correction value so that the signal level of the reproduction signal around a target cross timing determined based on the reproduction clock becomes closer to the distribution reference level;

a recording information recording section that forms the recording mark on the recording medium based on the recording signal generated by correcting a recording information signal generated from the recording information according to the recording correction value.

2. The optical information recording device according to claim 1, wherein the distribution reference level determination section sets a point where a distribution curve representing the correlation between the signal level of the white level and a rate at which this signal level appears crosses a distribution curve representing the correlation between the signal level of the black level and a rate at which this signal level appears, as the distribution reference level.

3. The optical information recording device according to claim 2, wherein:

the reproduction clock generation section ensures that half a cycle of the reproduction clock corresponds to half the reference mark length;

the correction calculation section ensures that the target cross timing is a time when the reproduction clock either rises or falls; and the distribution reference level determination section detects the signal level at another timing, when the reproduction clock either falls or rises, as the signal level of the white or black level.

4. The optical information recording device according to claim 1, wherein the correction calculation section calculates the recording correction value based on the difference in time between the target cross timing and a zero cross timing when the reproduction signal becomes the distribution reference level.

5. The optical information recording device according to claim 4, wherein if the difference in time is greater than or equal to a predetermined threshold, the correction calculation section lets the compensation information recording and reproduction section correct the compensation recording signal according to the recording correction value and perform the recording and reproduction of the compensation recording information.

6. The optical information recording device according to claim 5, wherein the correction calculation section calculates the recording correction value by multiplying the difference in time by an arbitrary constant value which is less than or equal to 1.

7. The optical information recording device according to claim 1, wherein the correction calculation section calculates the recording correction values for all the mark lengths.

8. The optical information recording device according to claim 1, wherein the correction calculation section calculates the recording correction value for each combination of the mark length and a space length.

9. The optical information recording device according to claim 2, wherein the recording medium is a volume-type recording medium on which a three-dimensional recording mark is recorded.

10. A recording correction calculation method that, when recording recording information by forming on a recording medium a recording mark whose mark length is an integral multiple of a reference mark length according to a recording signal generated from a recording information signal, calculates a recording correction value for the recording information signal generated from the recording information, the recording correction calculation method comprising:

a compensation information recording and reproduction step of, after recording compensation recording information by forming the recording mark on the recording medium according to a compensation recording signal generated from the compensation recording information which is an arbitrary recording information, generating a reproduction signal by reading out the compensation recording information from the recording medium;

a reproduction clock generation step of generating from the reproduction signal a reproduction clock whose cycle corresponds to the reference mark length;

a distribution reference level determination step of setting a signal level suitable for binarization determination of the reproduction signal as a distribution reference level, according to the difference in variation between white and black levels of the reproduction signal; and a correction calculation step of calculating the recording correction value for correcting the compensation recording signal, so that the reproduction signal becomes closer to the distribution reference level around a target cross timing determined based on the reproduction clock.

* * * * *